(12) United States Patent
Morrison et al.

(10) Patent No.: US 8,236,409 B2
(45) Date of Patent: Aug. 7, 2012

(54) GUSSETS FOR STRENGTHENING CMC FILLET RADII

(75) Inventors: Jay A. Morrison, Oviedo, FL (US); Gary B. Merrill, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 624 days.

(21) Appl. No.: 12/432,081

(22) Filed: Apr. 29, 2009

(65) Prior Publication Data

US 2010/0279072 A1 Nov. 4, 2010

(51) Int. Cl.
*B32B 1/00* (2006.01)
(52) U.S. Cl. ........................................ 428/172; 428/699
(58) Field of Classification Search .................. 428/172, 428/699
See application file for complete search history.

(56) References Cited

U.S. PATENT DOCUMENTS

| | | | |
|---|---|---|---|
| 4,626,461 A | 12/1986 | Prewo et al. | |
| 4,704,332 A | 11/1987 | Brennan et al. | |
| 5,348,056 A | 9/1994 | Tsuzuki | |
| 5,382,453 A | 1/1995 | Mason | |
| 6,013,592 A | 1/2000 | Merrill et al. | |
| 6,200,092 B1 | 3/2001 | Koschier | |
| 6,434,962 B1* | 8/2002 | Moretti et al. | 62/262 |
| 6,648,597 B1 | 11/2003 | Widrig et al. | |
| 6,733,907 B2 | 5/2004 | Morrison et al. | |
| 6,758,653 B2 | 7/2004 | Morrison | |
| 7,093,359 B2 | 8/2006 | Morrison et al. | |
| 2008/0087021 A1 | 4/2008 | Radonovich et al. | |
| 2008/0124512 A1* | 5/2008 | Steibel et al. | 428/105 |

* cited by examiner

*Primary Examiner* — David R Sample
*Assistant Examiner* — Laura Auer

(57) ABSTRACT

A ceramic matrix composite (CMC) structure (50) with first (26) and second (28) CMC walls joined at an intersection (34) containing continuous fibers (53). A gusset (52) is formed in the intersection by an inward bending of some or all ceramic fibers (53) of the intersection, resulting in a diagonal brace between the first and second CMC walls. This creates a depression (54) or void (59) in the intersection. One or more ceramic reinforcement devices fill or span the depression to prevent distortion of the gusset. The reinforcement devices may include a ceramic filler (60) or core (61), a CMC rod or cord (56), and a CMC tape (62). The ceramic filler (60) may be continuous with a ceramic insulation layer (36) on an outer surface of the first CMC wall.

17 Claims, 4 Drawing Sheets

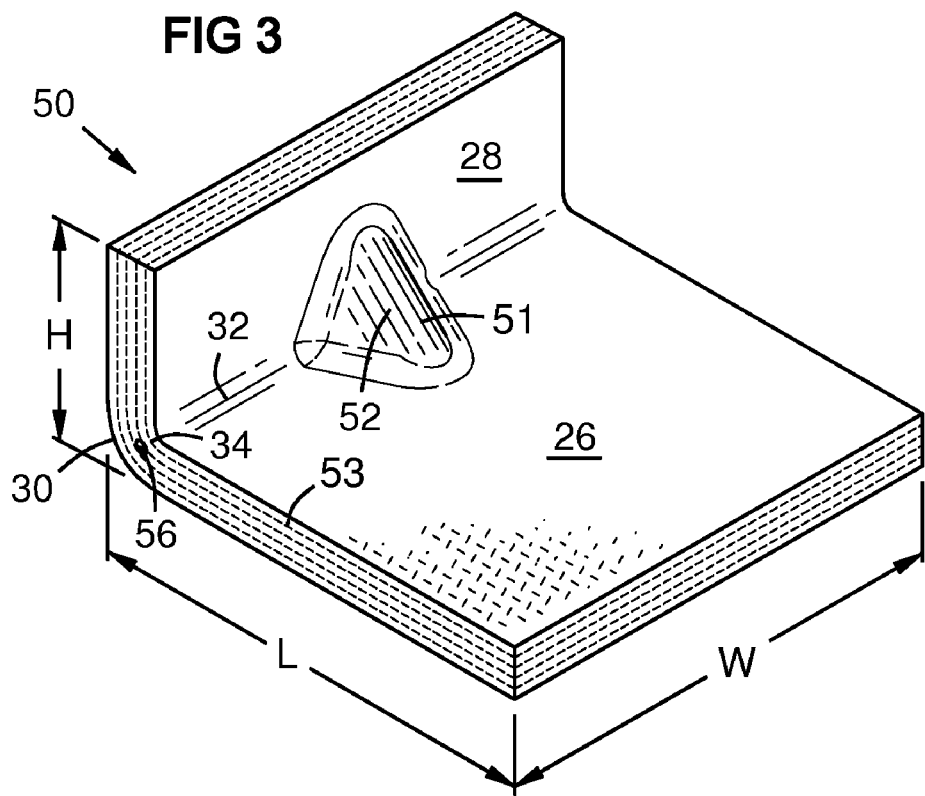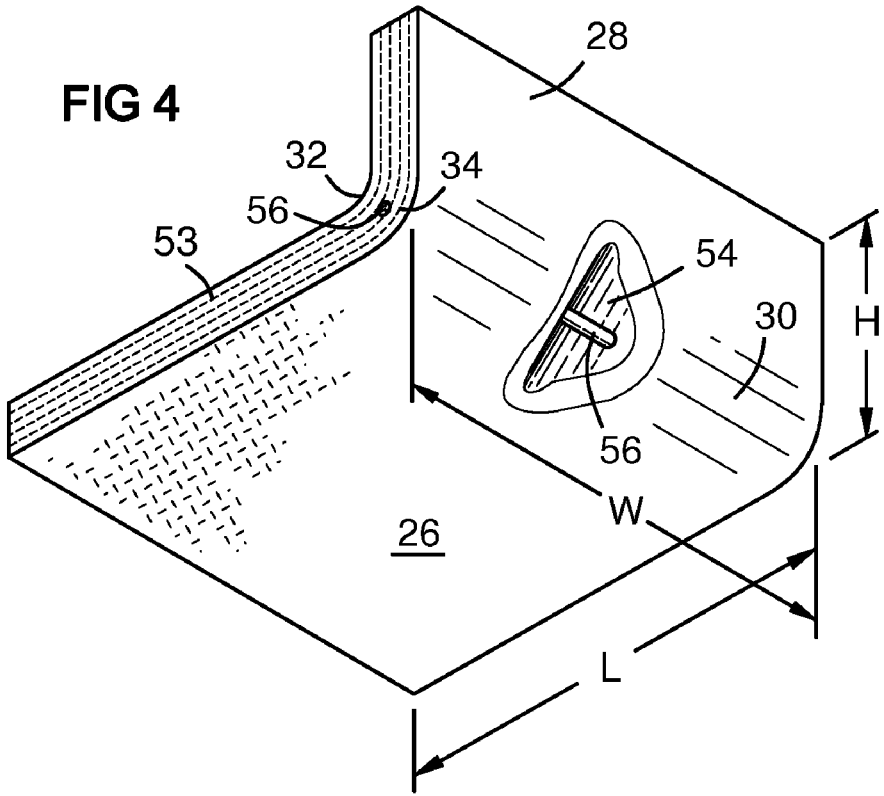

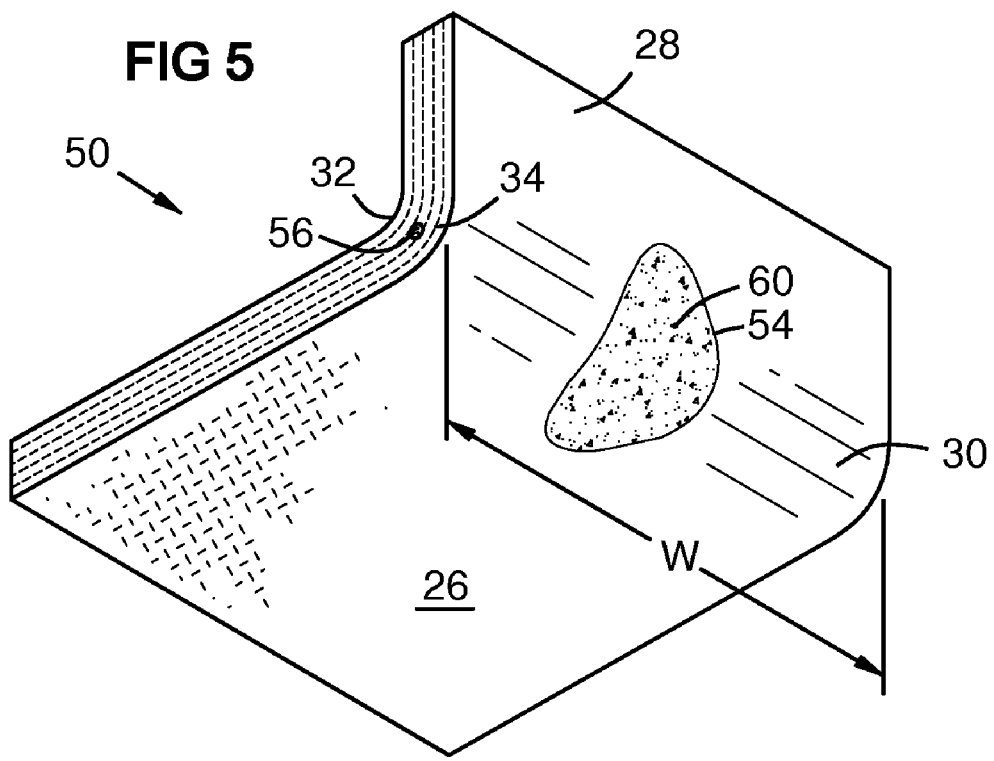
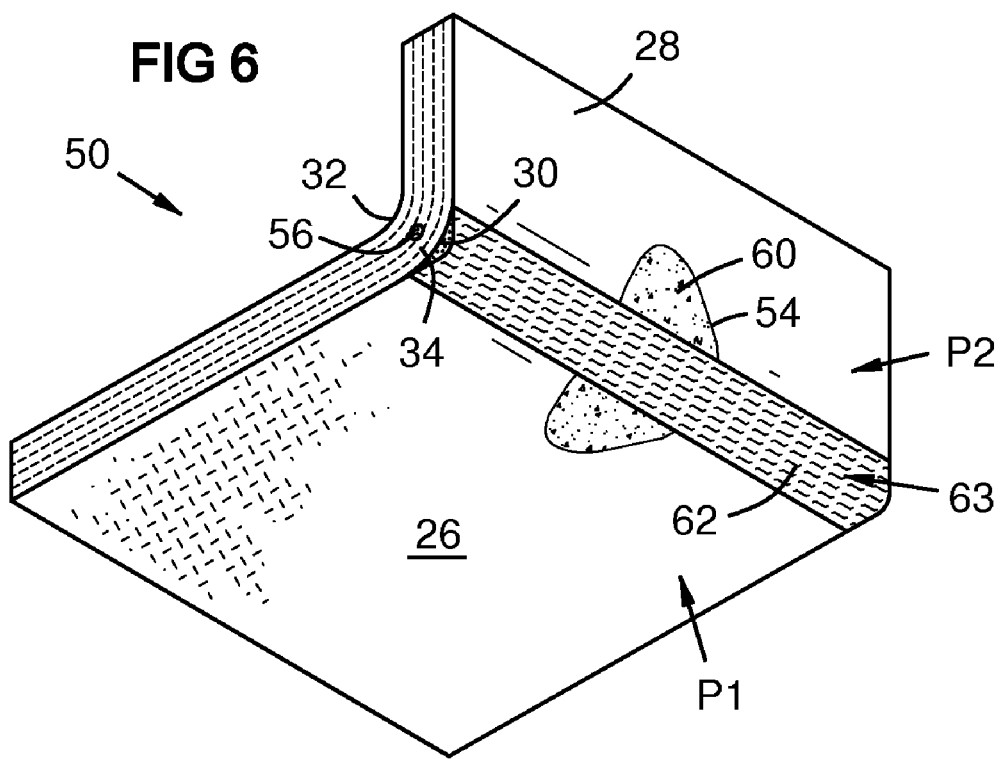

GUSSETS FOR STRENGTHENING CMC FILLET RADII

FIELD OF THE INVENTION

This invention relates to ceramic matrix composite (CMC) structures with load-bearing CMC wall intersections.

BACKGROUND OF THE INVENTION

Ceramic matrix composites (CMC) are used for components in high temperature environments, such in gas turbine engines. CMC is formed by combining ceramic fibers with a ceramic matrix, and heating the combined material to a sintering temperature. The fibers add tensile strength in the directions of the fibers. The resulting material has a higher operating temperature range than metal, and can be optimized for strength by fiber orientations and layering.

CMC laminate fabrication from ceramic 2D broadloom fabrics is a standard industry practice. For such laminates, a design-limiting aspect is the interlaminar tensile and shear strength of the material. This is especially true for load-bearing structures, wherein loads are reacted through CMC wall intersections or flanges.

FIG. 1 illustrates a prior art CMC structure 20, with layers of ceramic fibers or fabric 22 impregnated with a ceramic matrix 24, forming a first wall 26 and a second wall 28. The two walls are joined at an intersection 34 with a rounded outer edge 30 and an inside fillet 32. Relative bending moments between the two walls 26, 28 concentrate stresses in the intersection 34, which tends to separate the layers therein. In some gas turbine components, a ceramic thermal insulation layer 36 is applied to a surface 38 of the CMC.

Prior metal components such as brackets have been strengthened using gussets in wall intersection areas. A metal edge may be bent inward to form a gusset or diagonal brace between two wall portions. This has not been done for CMC components.

BRIEF DESCRIPTION OF THE DRAWINGS

The invention is explained in the following description in view of the drawings that show:

FIG. 3 is a perspective top view of a CMC structure according to the invention.
FIG. 4 is a perspective bottom view of the CMC structure of FIG. 3.
FIG. 5 shows a bottom view of a CMC structure according to the invention with a ceramic filler in the depression of the gusset.
FIG. 6 shows a bottom view of a CMC structure according to the invention with a CMC tape along the outer edge of the CMC wall intersection.

DETAILED DESCRIPTION OF THE INVENTION

Figure 1:
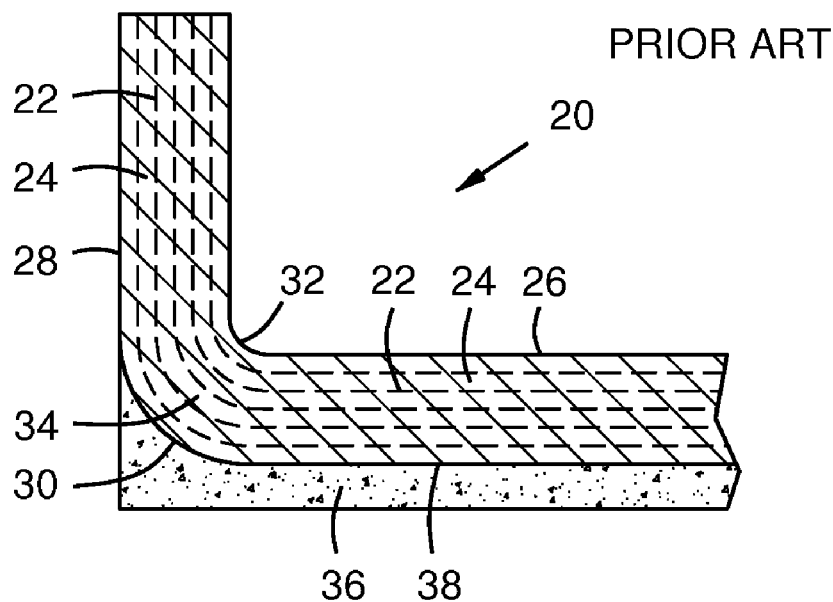
FIG. 1 shows a sectional view of a known CMC structure.
Figure 2:
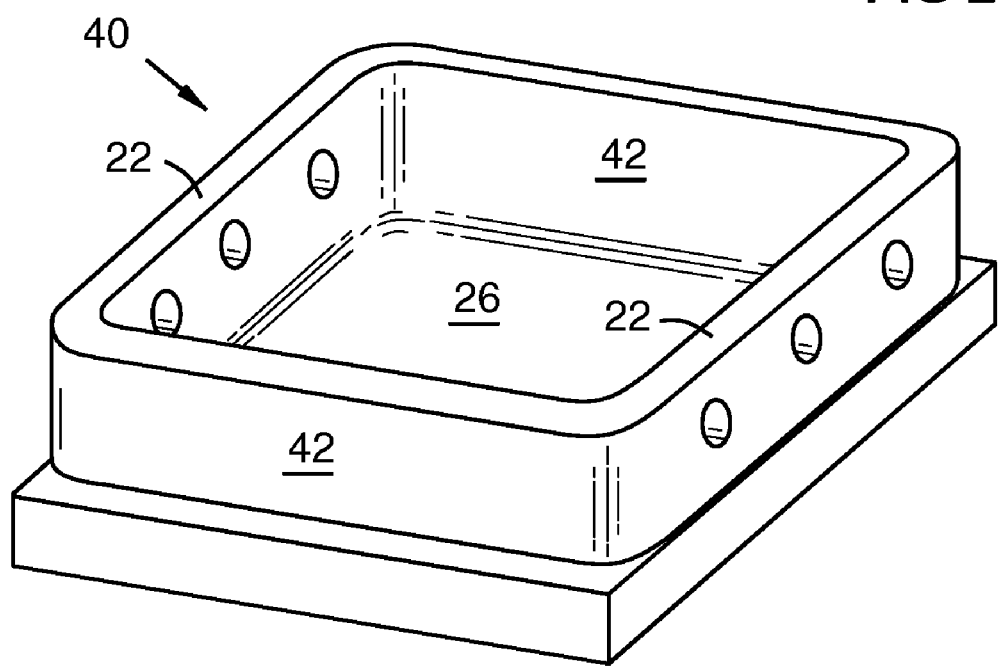
FIG. 2 shows a box frame component structure.

A CMC box frame component 40 is illustrated in FIG. 2 having CMC side walls 42. The strength of such a structure may be insufficient in some applications. FIG. 3 shows a CMC structure 50 with first and second walls 26, 28, joined at an intersection 34 with an outer surface 30 and an inner fillet 32. Length L, width W, and height H dimensions are indicated. A gusset 52 may be formed in the intersection by a CMC lay-up technique that creates a diagonal brace between the first and second walls 26, 28. The CMC walls 26, 28 include layers of ceramic fibers 53, at least some of which are continuous between the first and second walls and across the intersection 34. The fibers 53 may be part of a ceramic fabric. The gusset 52 contains some of the continuous fibers 53, and some of these may be diagonally-oriented fibers 51 in the gusset that are continuous with lengthwise fibers of the first wall, and with vertical fibers of the second wall. The fibers of the gusset 52 provide anisotropic strengthening to the intersection 34.

FIG. 4 shows a bottom view of the CMC structure of FIG. 3. The gusset may be formed by an inward bending of some or all layers of the intersection 34. If all layers are bent inward, a depression 54 is formed in an outer surface 30 of the intersection. One or more spans 56 of reinforcing CMC material may connect opposite sides of the depression 54 to prevent spreading of the gusset during operation. The CMC span 56 may pass through all or part of width W of the intersection 34, crossing one or more depressions 54. It may be inserted during wet lay-up by pulling one or more cords of wet CMC through the intersection 34 with a needle. Alternately, the CMC structure 50 may be fabricated, and then a hole may be bored through the width W of the intersection or just through the opposite sides of the gusset. A CMC or ceramic rod may be formed and fired, then inserted through the hole, along with a ceramic adhesive, and thermally bonded in the hole.

FIG. 5 shows a bottom view of a CMC structure 50 according to the invention with a ceramic filler 60 in the depression 54 to prevent a narrowing distortion of the gusset during operation. A CMC span 56 may be provided through the intersection as well.

FIG. 6 shows a bottom view of a CMC structure 50 according to the invention, with a CMC tape 62 along the outer edge 30 of the intersection 34. This tape may contain ceramic fibers that are oriented with the width W of the intersection to resist spreading of the gusset. The tape 62 may be limited in size to an area made available by the curvature of the outer edge 30 of the intersection 34 as shown, so the tape need not extend outside the extended outer dimensions of the walls 26, 28. In other words, the CMC tape 62 may have an outer surface 63 that is within the plane P1 of the outer surface of the first wall, and within the plane P2 of the outer surface of the second wall.

Figure 7:
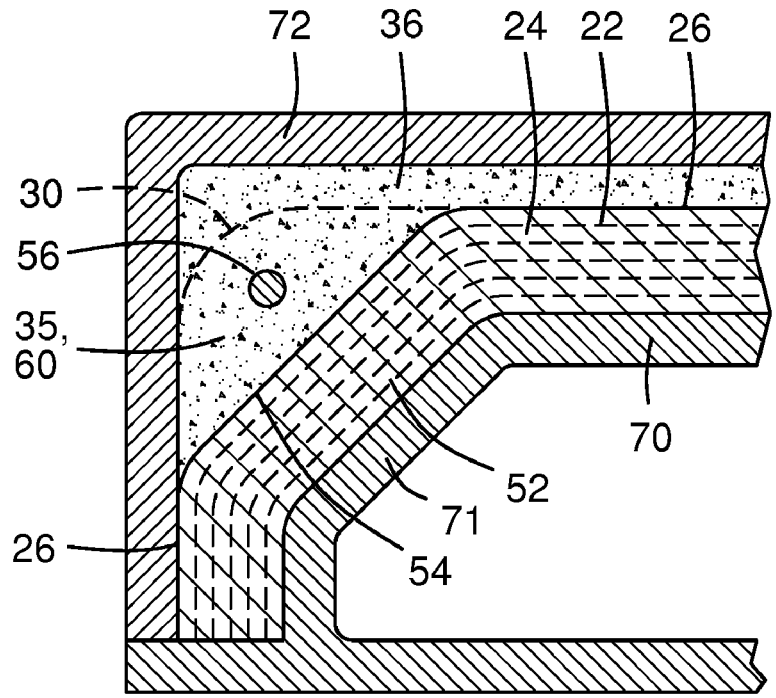
FIG. 7 is a partial sectional view illustrating a fabrication method of the invention.

FIG. 7 shows a method of forming a CMC structure according to the invention. A CMC lay-up may be done on a first form 70 that has a gusset-forming portion 71. The wet CMC is pressed into this portion 71, in which it complies without wrinkles due to normal fabric compliance. A ceramic fabric may be chosen that is not too tightly woven, so as to allow such compliance. A CMC cord or rod 56 may be inserted through the intersection 34 as previously described. A second form 72 may be placed over the CMC lay-up, and injected with a ceramic precursor slurry 35, using molding techniques known in ceramic arts, such as injection molding or slip-casting, producing a filler 60 in the depression 54 that may be continuous with a layer of ceramic insulation 36 as shown.

Figure 8:
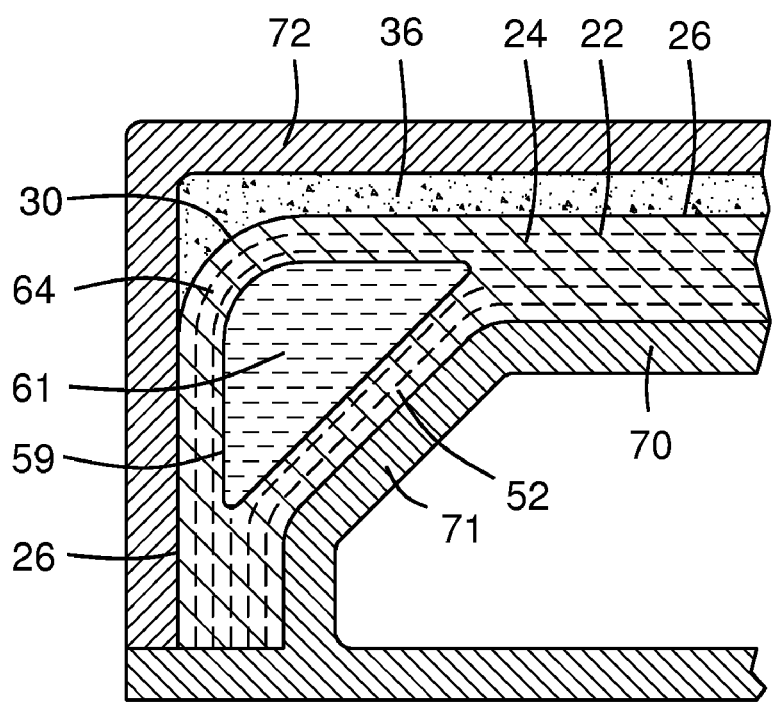
FIG. 8 is a partial sectional view showing a ceramic core in a hollow gusset.

FIG. 8 shows an embodiment of the invention with a ceramic core 61 in a void 59 of the gusset 52 that is formed between a diagonal inner CMC layer of the gusset and an outer CMC layer 64 of the wall material that covers the core. The outer layer 64 may follow the profile of the outer edge 30 of the intersection.

Alternately to the above lay-up methods, the wall and gusset structure can be fabricated by lay-up in a female mold and/or by pressing CMC material between shaped inner and outer hard tools.

Various combinations of the described features may be selected. For example, a CMC tape 62 may be used instead of, or in addition to, a CMC cord. A ceramic insulation layer may be used instead of, or in addition to, a CMC cord and/or a CMC tape. Multiple gussets may be formed along a given CMC wall intersection. A single CMC cord or rod may pass through all of the gussets. Multiple CMC cords or rods may pass through one or all of the gussets.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A ceramic matrix composite (CMC) structure comprising:
    first and second CMC walls joined at an intersection, the intersection having a width; and
    a gusset formed in the intersection at a position along the width;
    wherein the gusset contains ceramic fibers that are continuous with the first and second CMC walls and provide anisotropic strengthening to the intersection;
    wherein the gusset comprises an inward bending of the intersection that forms a depression in an outer surface of the intersection, and the depression is filled with a ceramic filler.

2. A ceramic matrix composite (CMC) structure according to claim 1, wherein at least some of the ceramic fibers of the gusset are diagonally oriented, and are continuous with fibers in the first and second CMC walls.

3. A ceramic matrix composite (CMC) structure according to claim 1, further comprising a span of reinforcing CMC material connected between first and second sides of the depression, spanning across the depression with fibers aligned with the width of the intersection.

4. A ceramic matrix composite (CMC) structure according to claim 3, wherein the span of reinforcing CMC passes substantially through the intersection along its width and across the depression.

5. A ceramic matrix composite (CMC) structure according to claim 1, further comprising a CMC tape bonded along the outer surface of the intersection, along the width of the intersection, and across the depression, wherein the CMC tape comprises ceramic fibers oriented with the width of the intersection.

6. A ceramic matrix composite (CMC) structure according to claim 5, wherein the CMC tape comprises an outer surface that does not extend beyond a plane of an outer surface of the first wall, and does not extend beyond a plane of an outer surface of the second wall.

7. A ceramic matrix composite (CMC) structure according to claim 1, wherein the ceramic filler is continuous with a layer of ceramic insulation on an outer surface of the first wall.

8. A ceramic matrix composite (CMC) structure comprising:
    first and second CMC walls joined at an intersection, the intersection having a width;
    layers of CMC fibers in the CMC structure that are continuous between the first and second CMC walls across the intersection;
    a gusset formed in the intersection at an intermediate position along the width thereof, the gusset comprising a diagonal brace between the first and second CMC walls;
    wherein all of the layers of CMC fibers of the intersection are bent inward at the intermediate position to form the gusset, forming a depression in an outer surface of the intersection; and
    a ceramic filler in the depression that prevents distortion of the gusset.

9. A ceramic matrix composite (CMC) structure according to claim 8, further comprising a span of CMC passing substantially through the intersection along its width and across the depression through the ceramic filler.

10. A ceramic matrix composite (CMC) structure according to claim 9, wherein the span of CMC is formed by a ceramic fiber cord impregnated with a ceramic matrix, wherein the ceramic fiber cord is pulled through the intersection during a wet lay-up condition of the CMC structure, and is then cured together with the CMC structure.

11. A ceramic matrix composite (CMC) structure according to claim 8, further comprising a CMC tape bonded along the outer surface of the intersection, along the width of the intersection and across the depression, wherein the CMC tape comprises ceramic fibers oriented with the width of the intersection.

12. A ceramic matrix composite (CMC) structure according to claim 11, wherein the CMC tape comprises an outer surface that does not extend beyond a plane of an outer surface of the first wall, and does not extend beyond a plane of an outer surface of the second wall.

13. A ceramic matrix composite (CMC) structure comprising:
    first and second CMC walls joined at an intersection, the intersection having a width;
    layers of CMC fibers in the CMC structure that are continuous between the first and second CMC walls across the intersection;
    a gusset formed between the first and second CMC walls at a position along the width of the intersection, the gusset formed as a diagonal brace between the first and second CMC walls by bending at least some of the layers of CMC fibers of the intersection inward; and
    a ceramic reinforcement in a depression or void of the gusset that prevents distortion of the gusset.

14. A ceramic matrix composite (CMC) structure according to claim 13, wherein the ceramic reinforcement comprises a span of reinforcing CMC material connected between first and second sides of the depression, spanning across the depression with fibers aligned with the width of the intersection.

15. A ceramic matrix composite (CMC) structure according to claim 14, wherein the span of reinforcing CMC passes substantially through the intersection along its width and across the depression.

16. A ceramic matrix composite (CMC) structure according to claim 13, wherein the ceramic reinforcement comprises a CMC tape bonded along the outer surface of the intersection, along the width of the intersection, and across the depression, wherein the CMC tape comprises ceramic fibers oriented with the width of the intersection.

17. A ceramic matrix composite (CMC) structure according to claim 16, wherein the CMC tape comprises an outer surface that does not extend beyond a plane of an outer surface of the first wall, and does not extend beyond a plane of an outer surface of the second wall.

* * * * *